United States Patent [19]

Field

[11] 4,112,319
[45] Sep. 5, 1978

[54] SYNCHRONOUS MOTOR WITH HETEROGENEOUSLY PITCHED TEETH

[75] Inventor: John H. Field, Norfolk, Mass.

[73] Assignee: Sigma Instruments, Inc., Braintree, Mass.

[21] Appl. No.: 753,883

[22] Filed: Dec. 23, 1976

[51] Int. Cl.² ............................................. H02K 37/00
[52] U.S. Cl. .................................................. 310/49 R
[58] Field of Search .................. 310/49 R, 162, 261, 310/262, 156, 12–14

[56] References Cited

U.S. PATENT DOCUMENTS

| | | | |
|---|---|---|---|
| 3,343,014 | 9/1967 | Giles | 310/49 R |
| 3,510,699 | 5/1970 | Fredrickson | 310/49 R |
| 3,601,640 | 8/1971 | Egawa | 310/49 R |
| 4,029,977 | 6/1977 | Chai et al. | 310/49 R |

Primary Examiner—Mark O. Budd
Attorney, Agent, or Firm—Toren, McGeady and Stanger

[57] ABSTRACT

In the disclosed motor, teeth on winding-energized stator poles project radially toward equally-pitched radially projecting rotor teeth energized by a permanent magnet. The pitches of the teeth on each stator pole vary but have an average pitch approximately equal to the pitch of the rotor teeth.

24 Claims, 11 Drawing Figures

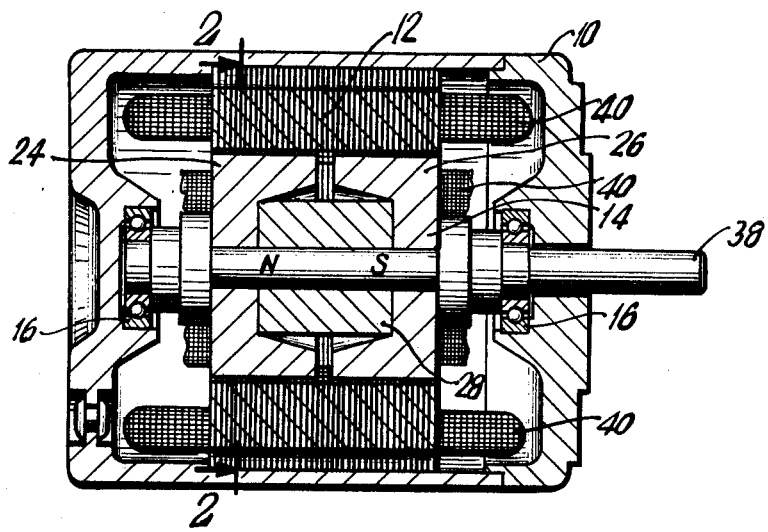
FIG. 1
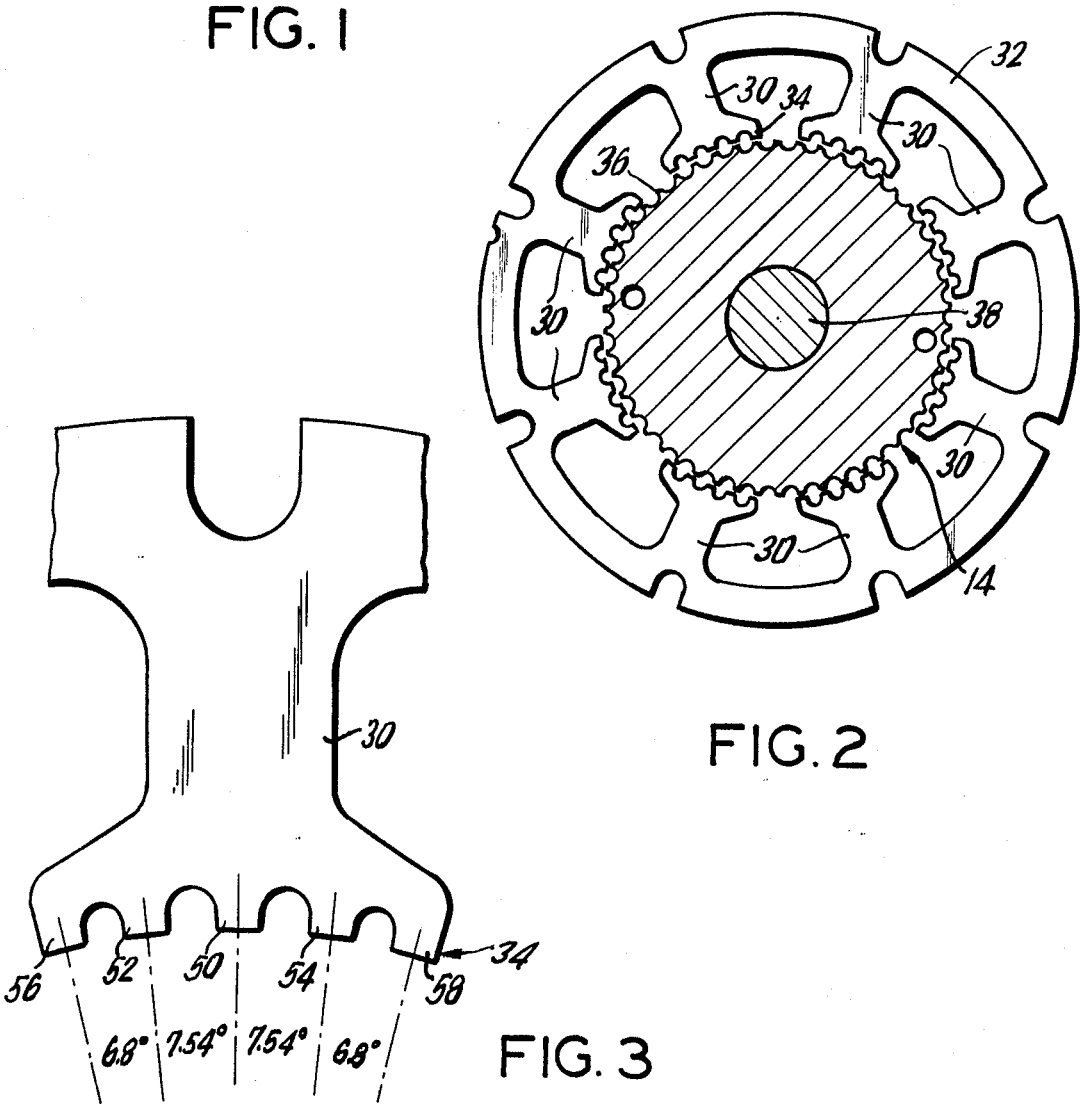
FIG. 2
FIG. 3

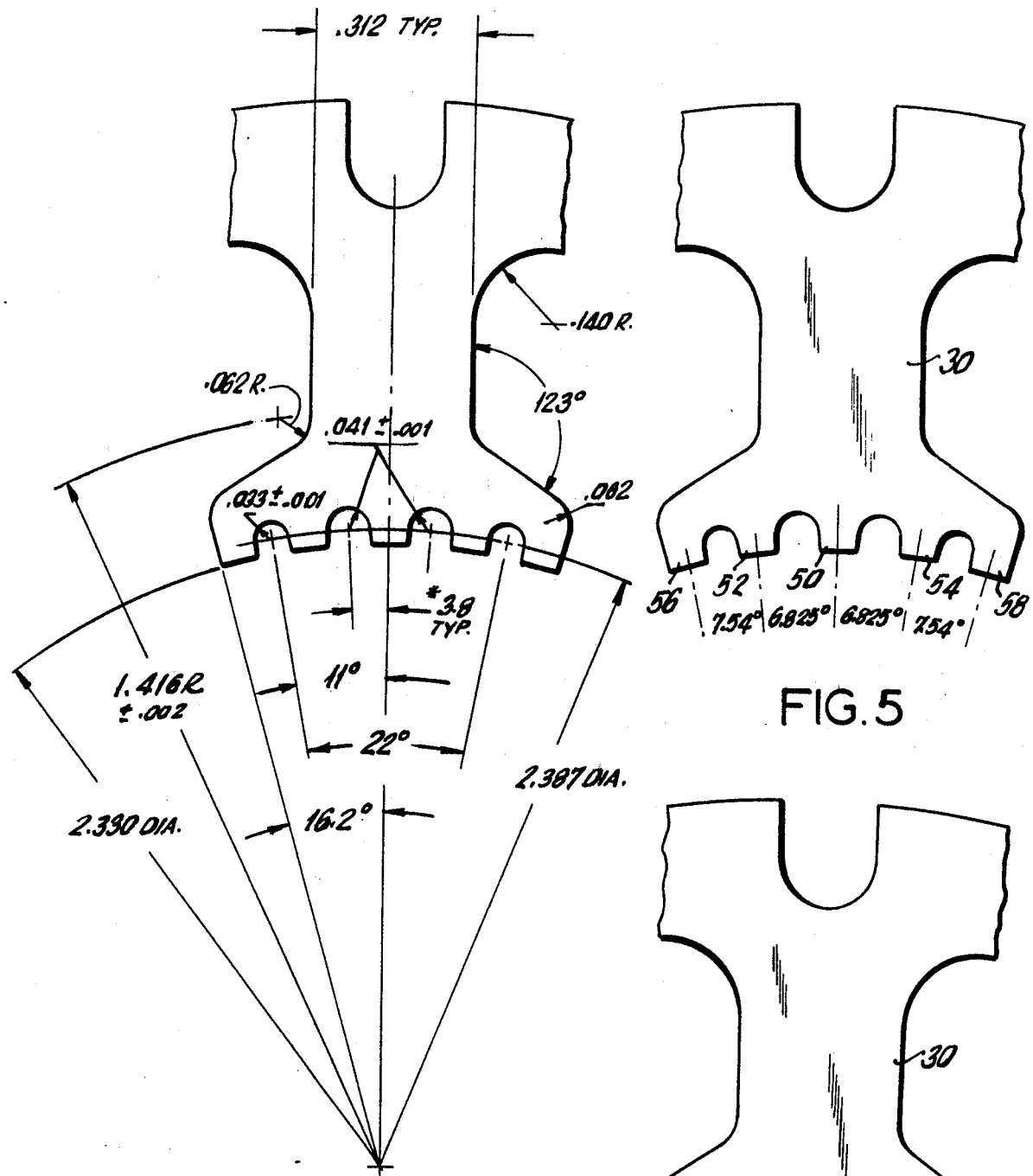
FIG.4
FIG.5
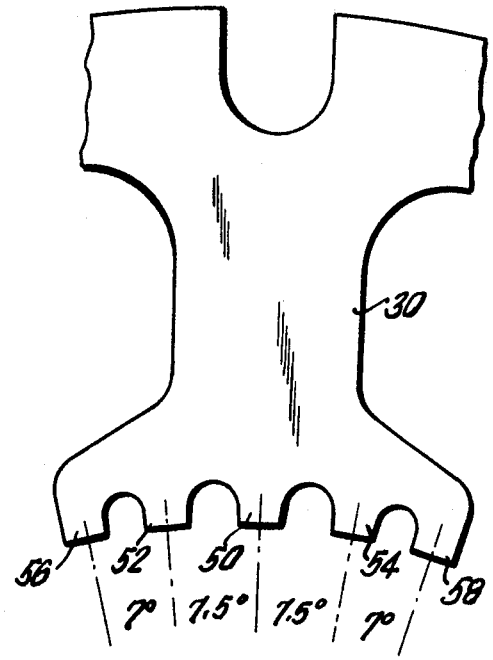
FIG.6

SYNCHRONOUS MOTOR WITH HETEROGENEOUSLY PITCHED TEETH

BACKGROUND OF THE INVENTION

This invention relates to synchronous motors, and particularly to synchronous motors having winding-energized stator poles with stator teeth projecting radially toward the magnetized teeth on a rotor carrying a permanent magnet.

Such motors and their operation are described in an article entitled "New Inductor Motor has Low Speed, Self-start and High Torque" by J. H. Staak, page 115 et seq. in the June 1947 issue of Electrical Manufacturing published by the Gage Publishing Company, New York, New York and in patents such as Reissue Nos. 25,445; 3,077,555 and 3,343,014. In all these patents and publications, the motors possess rotors with uniformly pitched teeth and stator poles with uniformly pitched teeth. In the Staak article and U.S. Pat. No. 3,343,014 the pitches of the rotor teeth and stator teeth are equal to each other. In U.S. Pat. No. 3,077,555 and Reissue No. 25,445, the pitches of the rotor teeth and the pitches of the stator teeth, although they are uniform, are not equal to each other.

Each of these types of motors has some disadvantages as compared to the other. For example, motors with unequally pitched rotor and stator teeth often exhibit lower torques and are not as easy to stop at predetermined angular positions. On the other hand, motors with equally pitched rotor and stator teeth are noisier and do not operate as smoothly as the other types. The equally pitched type motors exhibit higher spring mass resonances than the unequally pitched type motors. On the other hand the latter have far lower setting times.

An object of this invention is to overcome some of the disadvantages of one motor while retaining the advantages of the other. Another object of the invention is to improve synchronous motors.

SUMMARY OF THE INVENTION

According to a feature of this invention, these objects are attained in whole or in part, by making the pitches of the stator or rotor teeth heterogeneous while keeping the average pitches of the rotor and stator teeth on each pole substantially equal to each other.

According to an embodiment of the invention, the pitch of the rotor teeth is uniform but the pitches of the stator teeth on each pole vary about an average pitch approximately equal to the pitch of the rotor teeth.

According to another feature of the invention, the minimum variation in the pitches within each stator pole is greater than the amount the average pitch of the stator teeth on each pole, departs from the uniform pitch of the rotor teeth.

According to another feature of the invention, the sizes of the stator teeth vary within each pole.

According to another feature of the invention, the variation in pitch is symmetrical about the center of each stator pole.

According to another feature of the invention, the stator poles are equi-angularly and symmetrically arranged on the stator and the pitches of the stator teeth are symmetrically varied on each stator tooth.

According to another feature of the invention, the outer extreme teeth on each stator pole are made smaller in the angular dimension than the mean teeth.

These and other features of the invention are pointed out in the claims forming part of the specification. Other objects and advantages of the invention will become evident from the following detailed description when read in light of the accompanying drawings.

BRIEF DESCRIPTION OF THE DRAWINGS

In the drawings:

FIG. 1 is a sectional view of a motor embodying features of the invention.

FIG. 2 is a section 2—2 of the motor in FIG. 1.

FIG. 3 is a detailed view of a portion of the section in FIG. 2.

FIGS. 4 to 11 are sectional views of other motors embodying features of the invention.

DETAILED DESCRIPTION OF PREFERRED EMBODIMENTS

Figure 7:
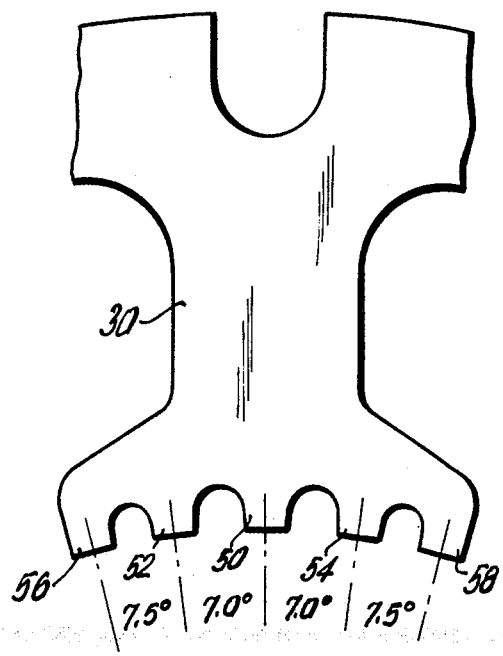
Figure 9:
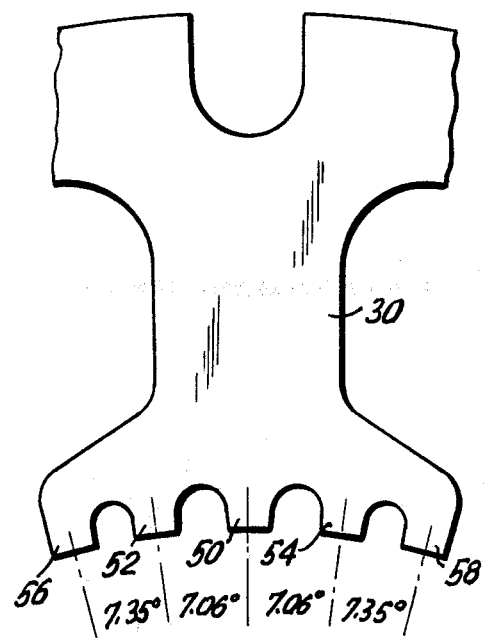

In FIG. 1, a motor housing 10 encloses an axially-continuous laminated stator 12 which in turn coaxially surrounds a rotor 14. The rotor is rotatable in suitable bearings 16 mounted in the housing 10. The laminations of the stator 12 extend transverse to the stator axis and encircle respective pole shoes 24 and 26 of the rotor 14. Separating the pole shoes 24 and 26 is an axially magnetized permanent magnet 28 which magnetizes the pole shoe 24 with one magnetic polarity while magnetizing the pole shoe 26 with the opposite magnetic polarity. The pole shoes 24 and 26 and the laminations of the stator 12 are each made of soft magnetic material.

Within the stator 12, as shown in FIG. 2, eight equiangularly spaced stator poles 30 project integrally and radially inward from a surrounding ring 32. The poles 30 extend axially to alignment with each other along the length of the stator 12. Each of the poles 30 terminates in five stator teeth 34 which lie along a cylindrical gap formed between the poles and the rotor 14. Each of the pole shoes 24 and 26 of the rotor 14 terminates radially in radially projecting and axially extending rotor teeth 36. The outward extremities of the teeth define the radially inward limit of the gap between stator and rotor. In the disclosed embodiment, each pole shoe 24 and 26 terminates in fifty equi-angularly spaced, i.e. equally pitched, rotor teeth. However, the rotor teeth of the pole shoe 24 are peripherally misaligned from the rotor teeth of the pole shoe 26 by one-half tooth pitch. This contrasts with the stator teeth 34 which are peripherally aligned along the axial length of the stator 12.

An output shaft 38 is keyed to the rotor 14 for rotation therewith. The housing 10 holds the stator 12. Suitable windings 40 surround the poles 30.

The spacing of the fifty rotor teeth 36 forms a 7.2° pitch between the rotor teeth. According to the invention, the pitches of the stator teeth on each pole are not equal to each other, but the pitches have an average equal to or nearly equal to the rotor pitch.

Details of the teeth on all the poles are illustrated by the example in FIG. 3 of one pole which is identical to all the other poles. Here, the angular distances between the center of the center tooth 50 and the centers of the respective adjacent teeth 52 and 54 are approximately 7.54°. Along 360°, this corresponds to approximately 47 teeth. The angular distances between the centers of the teeth 52 and 54 and the adjacent outer teeth 56 and 58 are approximately 6.8°. This corresponds to 53 teeth within a 360° periphery. The average pitch is approximately 7.16° which corresponds to approximately 50 teeth within a 360° periphery. FIG. 4 illustrates typical dimensions of a pole.

According to an embodiment of the invention the outer angular dimensions of the outer edges of the teeth on each pole, from outer edge to outer edge, is 32.4°. This dimension corresponds precisely to the dimension which would be used if the stator tooth pitches were the same as the rotor tooth pitches. As a result, the angular widths of the outer teeth 56 and 58 are somewhat less than the angular widths of the inner teeth 52, 50, and 54.

According to the embodiment in FIG. 5, the pitches between the teeth 50 and 52 on the one hand and 50 and 54 on the other hand, are 6.825° while the pitches between teeth such as 54 and 58, and 52 and 56, are 7.54°. In terms of number of teeth along a full 360° periphery, this corresponds to 53 teeth based on the pitch between teeth 50 and 54 and between teeth 50 and 52, and 47 teeth based on the pitch between teeth 52 and 56, and between teeth 54 and 58.

According to the embodiment of the invention in FIG. 6, other tooth pitches are used. In one embodiment, two different pitches, each corresponding to 48 teeth along a 360° periphery, and 52 teeth along the 360° periphery, namely, 7.5° and 7° are used. The pitches vary symmetrically about the center tooth. Thus, the pitches from the center to adjacent teeth are 7.5° and the pitches from the outer teeth to the inner adjacent teeth are 7°. According to another embodiment in FIG. 7 these pitches are reversed. That is, the pitches between the center tooth and the adjacent outer teeth are 7°, while the pitches between the extreme outer teeth and the adjacent inner teeth are 7.5°.

Figure 8:
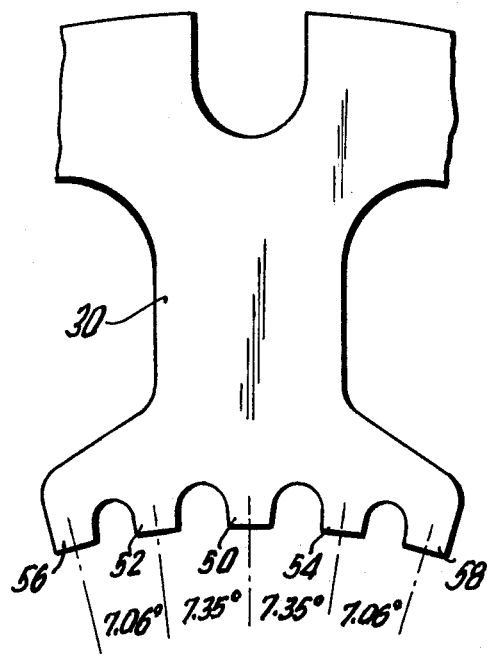
Figure 10:
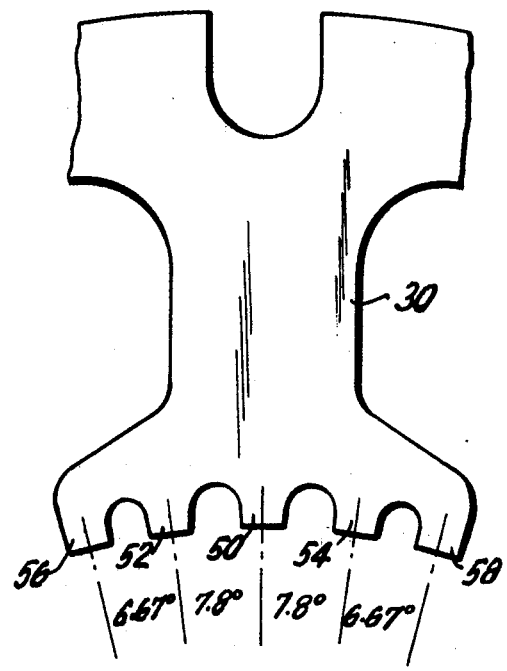
Figure 11:
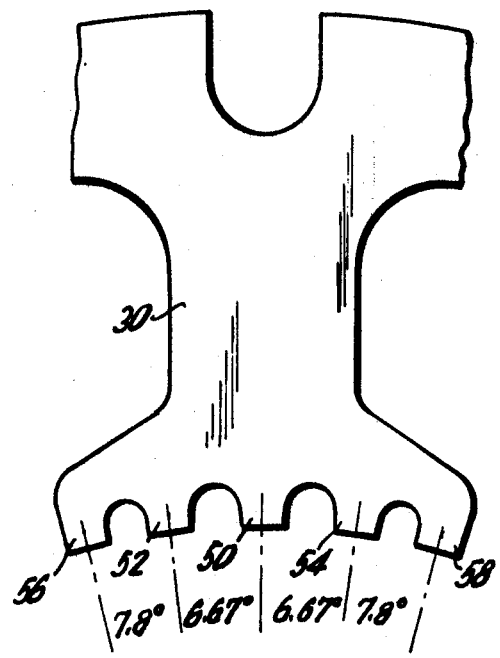

According to the embodiment of the invention in FIG. 8, the pitches correspond to 51 teeth along the periphery and 49 teeth along the periphery. Thus, the pitches are 7.35° from the center tooth and 7.06° from the extreme teeth on each pole. Accordingly to the embodiment of the invention in FIG. 7, these pitches are reversed. That is, the 7.06° pitches are between the center and the adjacent teeth while the 7.35° pitches are from the extreme outer teeth on each pole. In all of these embodiments, pitches are measured from center to center of each of the teeth. Pitches from the center teeth of 7.8°, corresponding to 46 teeth along the 360° periphery and 6.67° from the extreme teeth, corresponding to 54 teeth along the 360° periphery. These pitches are also reversed with respect to center and extreme teeth, according to another embodiment of the invention. These latter two embodiments appear in FIGS. 10 and 11.

In all of these embodiments, the minimum departure from the average pitch on a pole 30 or a pole shoe is greater than the difference between the average pitch of the rotor and the average pitch of teeth on a stator pole.

The motor elements may be assembled in the usual manner and windings of the motors disclosed may be energized as illustrated in U.S. Pat. No. 3,343,014, the aforementioned Staak article, Reissue U.S. Pat. No. 25,445, U.S. Pat. No. 3,077,555, or U.S. patent application Ser. No. 654,400 filed February 2, 1976, of John Field, assigned to the same assignee as this application. The motor speed is determined by the number of rotor teeth and the energization of the windings.

The invention eliminates disadvantages associated with known unequally pitched and equally pitched stepping motors It should be noted in the drawings that because of the comparatively small differences, the pitches have been dimensioned, but not drawn in precise proportion.

The tolerances for all the angles in the aforementioned embodiments is ±0.1°. According to other embodiments the tolrances are ±0.05°.

While embodiments of the invention have been described in detail, it will be obvious to those skilled in the art that the invention may be embodied otherwise without departing from its spirit and scope.

What is claimed is:

1. An electric motor, comprising a stator having an axis, said stator having a plurality of axially extending radially projecting stator poles, a rotor, said rotor having a pair of rotor members coaxial with said stator and positioned at two positions along the axis, said stator and said rotor being axially rotatable relative to each other, said rotor members being at least partially radially aligned with said stator poles, magnetic means magnetically coupled to said rotor members for causing one member to exhibit a magnetic polarity opposite to that of the other member, said rotor members having a plurality of radially projecting rotor teeth, said stator poles each having a plurality of pole teeth radially projecting toward said rotor teeth, the teeth on one of said rotor members being angularly displaced one-half tooth pitch from the teeth on the other of said rotor members, the teeth on each of said stator poles having substantially the same average pitch as the teeth of the rotor members but having varying pitches within each pole which pitches vary symmetrical about the average pitch.

2. A synchronous motor, comprising a stator and a rotor, said stator having a plurality of stator poles, a winding arrangement surrounding said poles, each of said poles having a set of stator teeth, said rotor having a set of rotor teeth opposing said stator teeth and forming a gap between the rotor teeth and the stator teeth, the pitches of the teeth in the rotor being uniform and the pitches of the teeth in the set of stator teeth varying from a minimum value to a maximum value but having an average pitch which differs from the uniform rotor teeth pitch by less than the minimum value differs from the uniform rotor teeth pitch.

3. A motor as in claim 2, wherein the pitches of the teeth vary on each of the poles.

4. A motor as in claim 3, wherein the pitches in the set of teeth on each pole are symmetrical in value about the average stator teeth pitch.

5. A motor as in claim 3, wherein the variation in pitches of the set of teeth on each pole is symmetrical about the center of each pole.

6. A motor as in claim 5, wherein the poles are equiangularly radially arranged, and the pitches increase circularly from the radial center of each pole.

7. A motor as in claim 5, wherein the pitches decrease circularly from the radial center of each pole.

8. A motor as in claim 1, wherein said rotor and said stator are coaxial and the teeth of said rotor project radially toward the stator and the stator teeth project radially toward the rotor teeth, said teeth all extending axially along a common axis of said rotor and said stator, said rotor including a pair of axially spaced portions and each portion including a set of teeth, said poles being aligned at least partially with said rotor portions, the teeth in one portion of said pairs being misaligned from the teeth in the other of said portions of the one of said pairs by one-half tooth pitch, the teeth in the other of the pairs being aligned.

9. A motor as in claim 8, wherein the pitches of the teeth on both rotor portions are uniform and the set of teeth on each of the stator poles varies.

10. A motor as in claim 8, wherein the pitches decrease circularly from the radial center of each pole.

11. A motor as in claim 3, wherein the sizes of the teeth in the circumferential directions vary on each of the poles.

12. A motor as in claim 3, wherein the number of poles is eight, the number of teeth is fifty, and the pitches of the teeth vary from 6.8° to 7.54°, ± 0.1°.

13. A motor as in claim 3, wherein the number of poles is eight, the number of teeth is fifty, and the pitches of the teeth vary from 6.285° to 7.54°, ± 0.1°.

14. A motor as in claim 3, wherein the number of poles is eight, the number of teeth is fifty, and the pitches of the teeth vary from 7° to 7.5°, ± 0.1°.

15. A motor as in claim 3, wherein the number of poles is eight, the number of teeth is fifty, and the pitches of the teeth vary from 7.06° to 7.35°, ± 0.1°.

16. A motor as in claim 3, wherein the number of poles is eight, the number of teeth is fifty and the pitches of the teeth vary from 6.67° to 7.8°, ± 0.1°.

17. A motor as in claim 3 wherein the number of poles is eight and the number of teeth on each pole is five and the pitches on each pole vary peripherally in the order 6.8°, 7.54°, 7.54°, 6.8°, ± 0.1°.

18. A motor as in claim 3, wherein the number of poles is eight and the number of teeth on each pole is five and the pitches on each pole vary peripherally in the order 7.54, 6.825, 6,825, 7.54, ± 0.1°.

19. A motor as in claim 3 wherein the number of poles is eight and the number of teeth on each pole is five and the pitches on each pole vary peripherally in the order 7°, 7.5°, 7°, ± 0.1°.

20. A motor as in claim 3, wherein the number of poles is eight and the number of teeth on each pole is five and the pitches on each pole vary peripherally in the order 7.5°, 7.0°, 7.0°, 7.5°, ± 0.1°.

21. A motor as in claim 3, wherein the number of poles is eight and the number of teeth on each pole is five and the pitches on each pole vary peripherally in the order 7.06°, 7.35°, 7.35°, 7.06°, ± 0.1°.

22. A motor as in claim 3, wherein the number of poles is eight and the number of teeth on each pole is five and the pitches on each pole vary peripherally in the order 7.35°, 7.06°, 7.06°, 7.35°, ± 0.1°.

23. A motor as in claim 3, wherein the number of poles is eight and the number of teeth on each pole is five and the pitches on each pole vary peripherally in the order 6.67°, 7.8°, 7.8°, 6.67°, ± 0.1°.

24. A motor as in claim 3, wherein the number of poles is eight and the number of teeth on each pole is five and the pitches on each pole vary peripherally in the order 7.8°, 6.67°, 6.67°, 7.8°, ± 0.1°.

* * * * *